Figure 22:
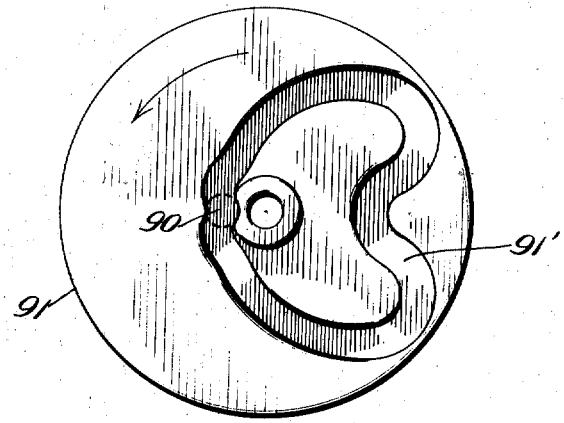
Figure 25:
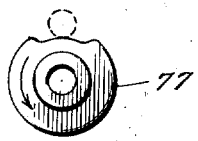
Figure 23:
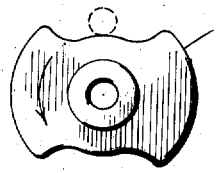

L. P. VALIQUET.
AUTOMATICALLY OPERATED TALKING MACHINE.
APPLICATION FILED OCT. 27, 1904.
1,224,979.
Patented May 8, 1917.
14 SHEETS—SHEET 1.
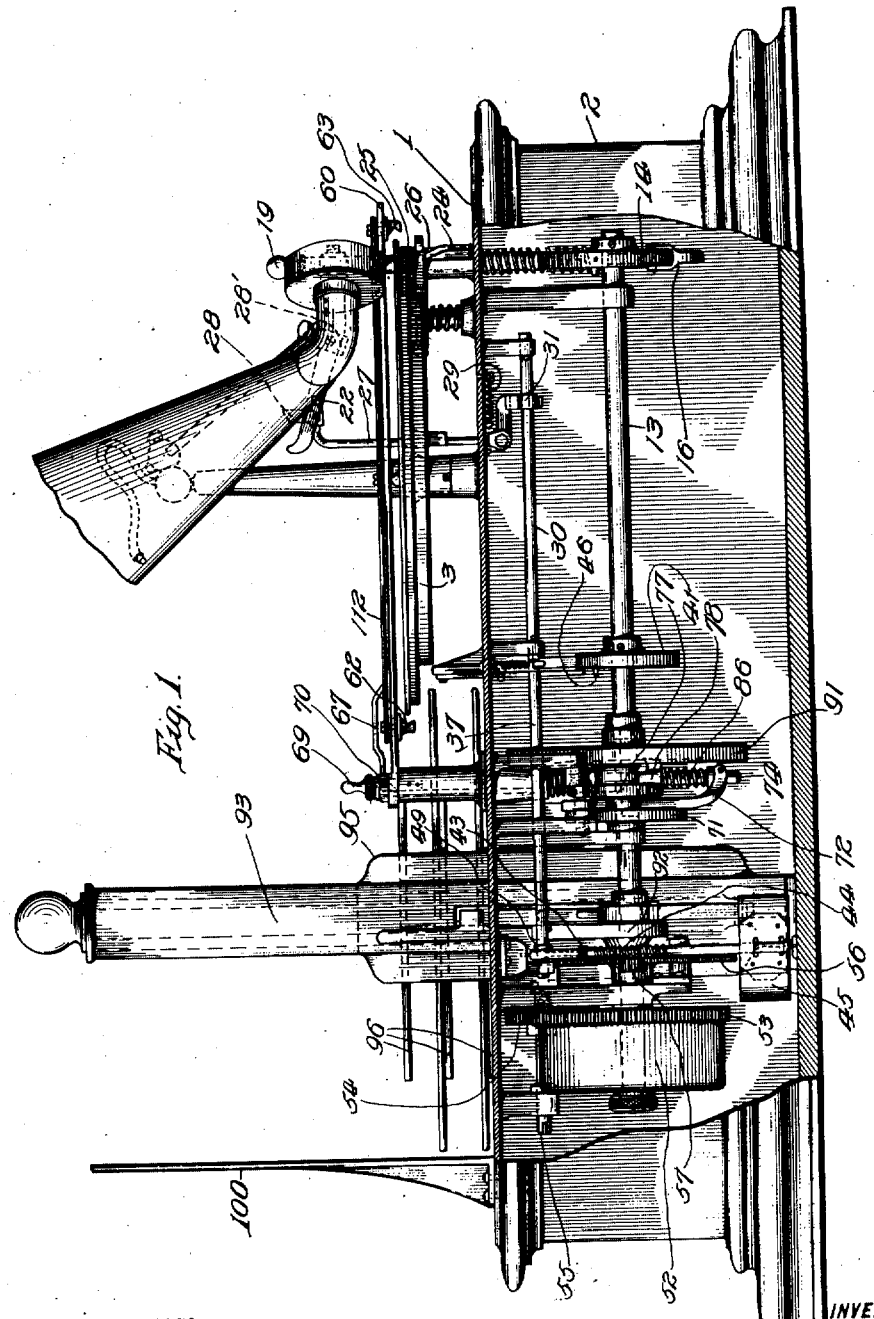
WITNESSES:
F. J. Hartman.
Edw. W. Vaill Jr.
INVENTOR
Louis P. Valiquet.
BY
ATTORNEY.

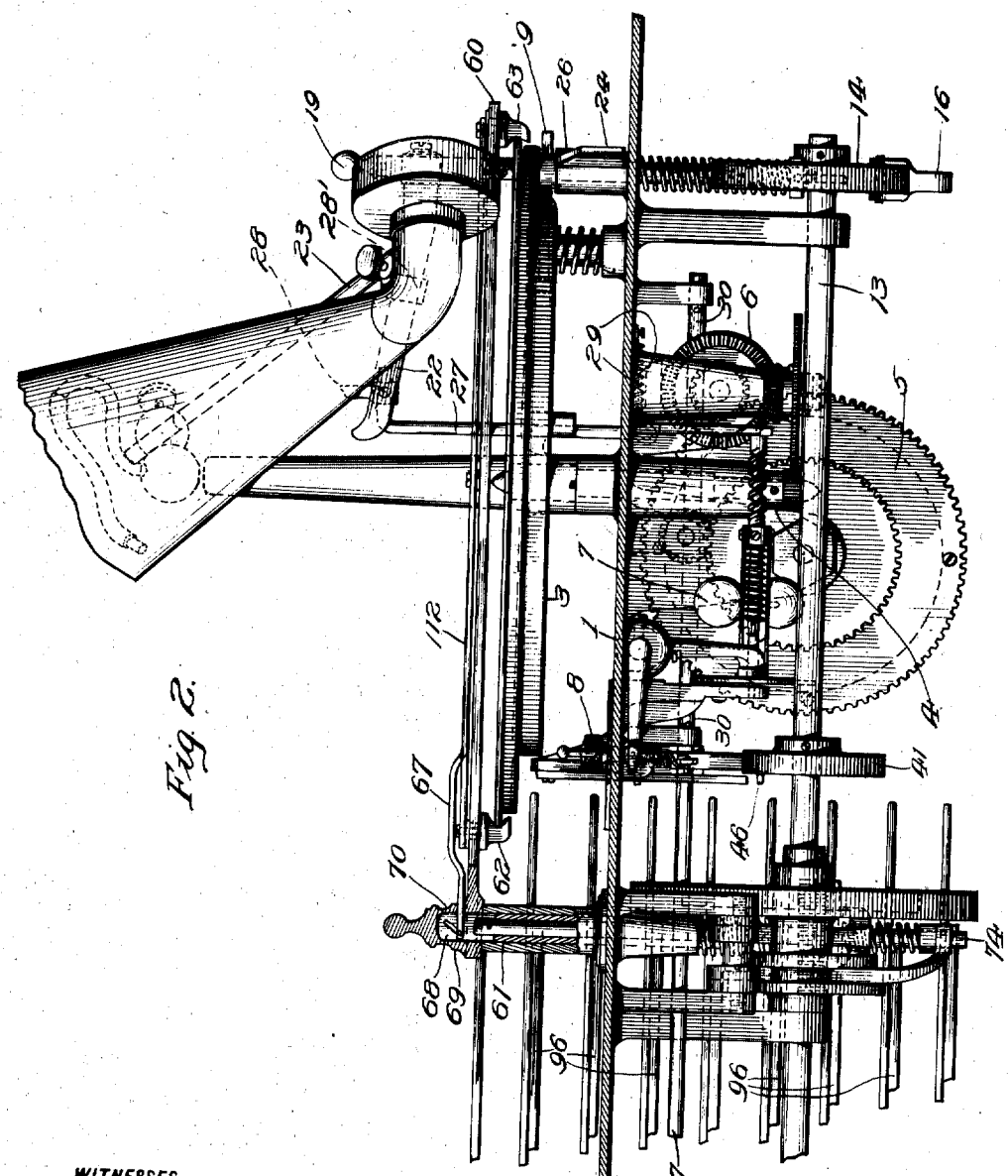

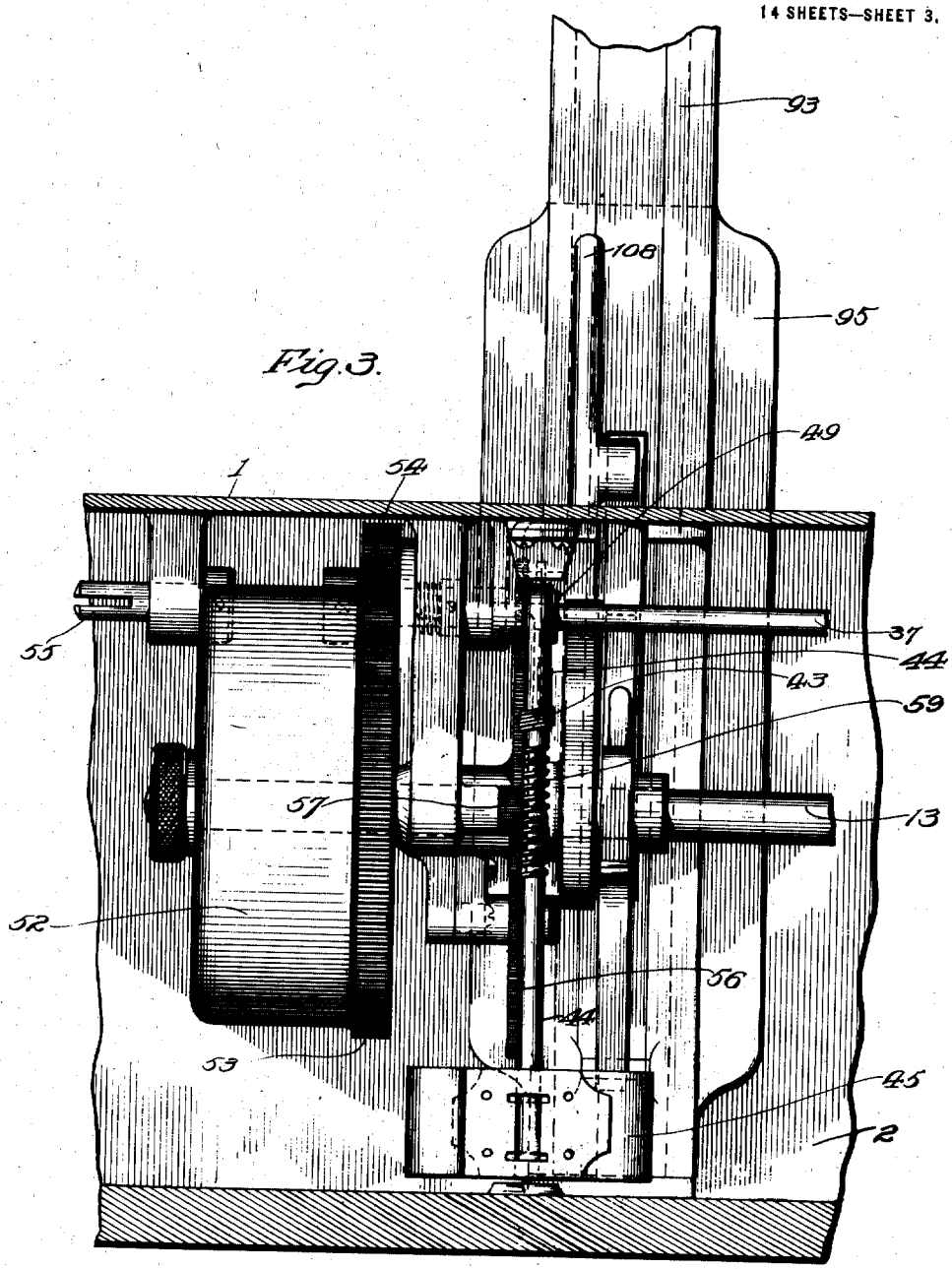

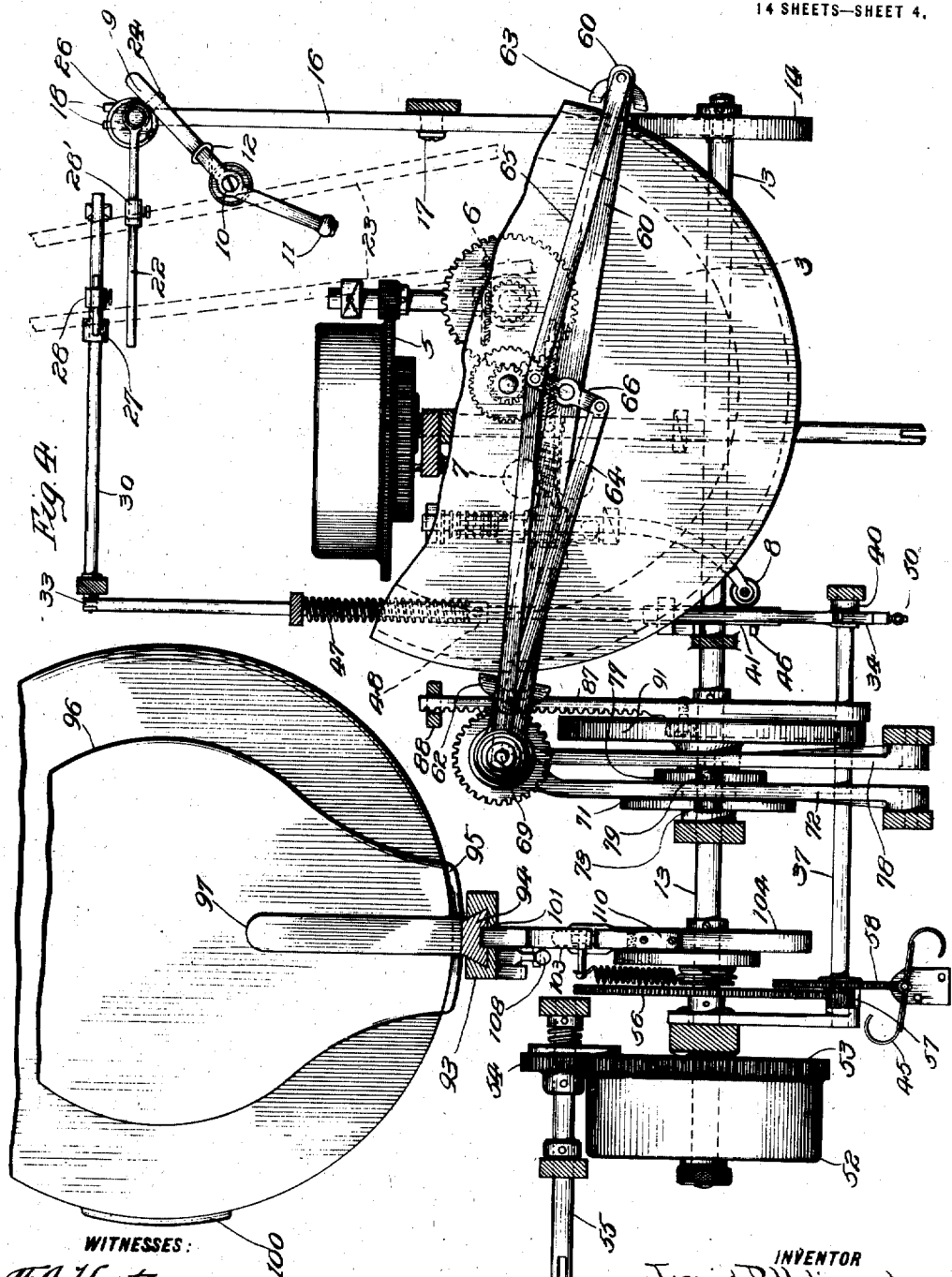

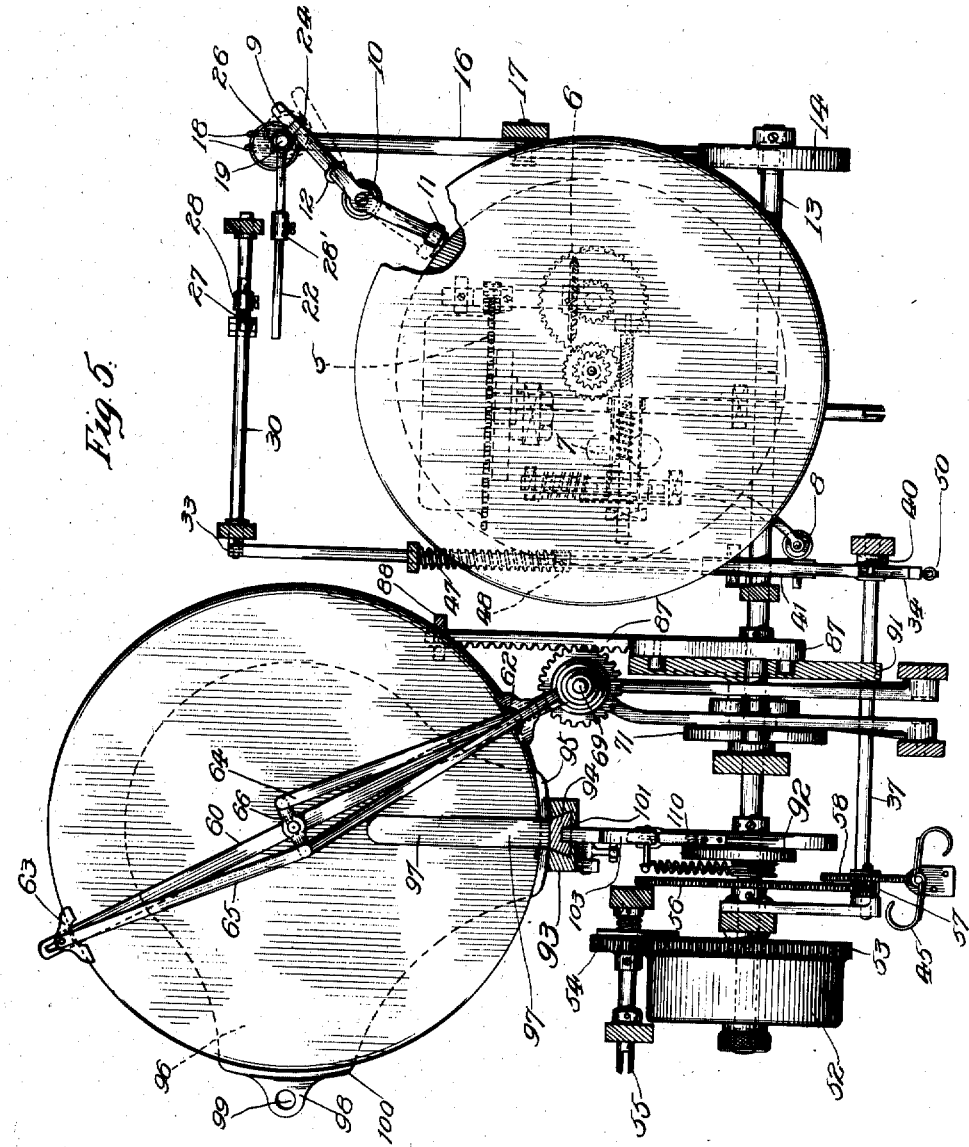

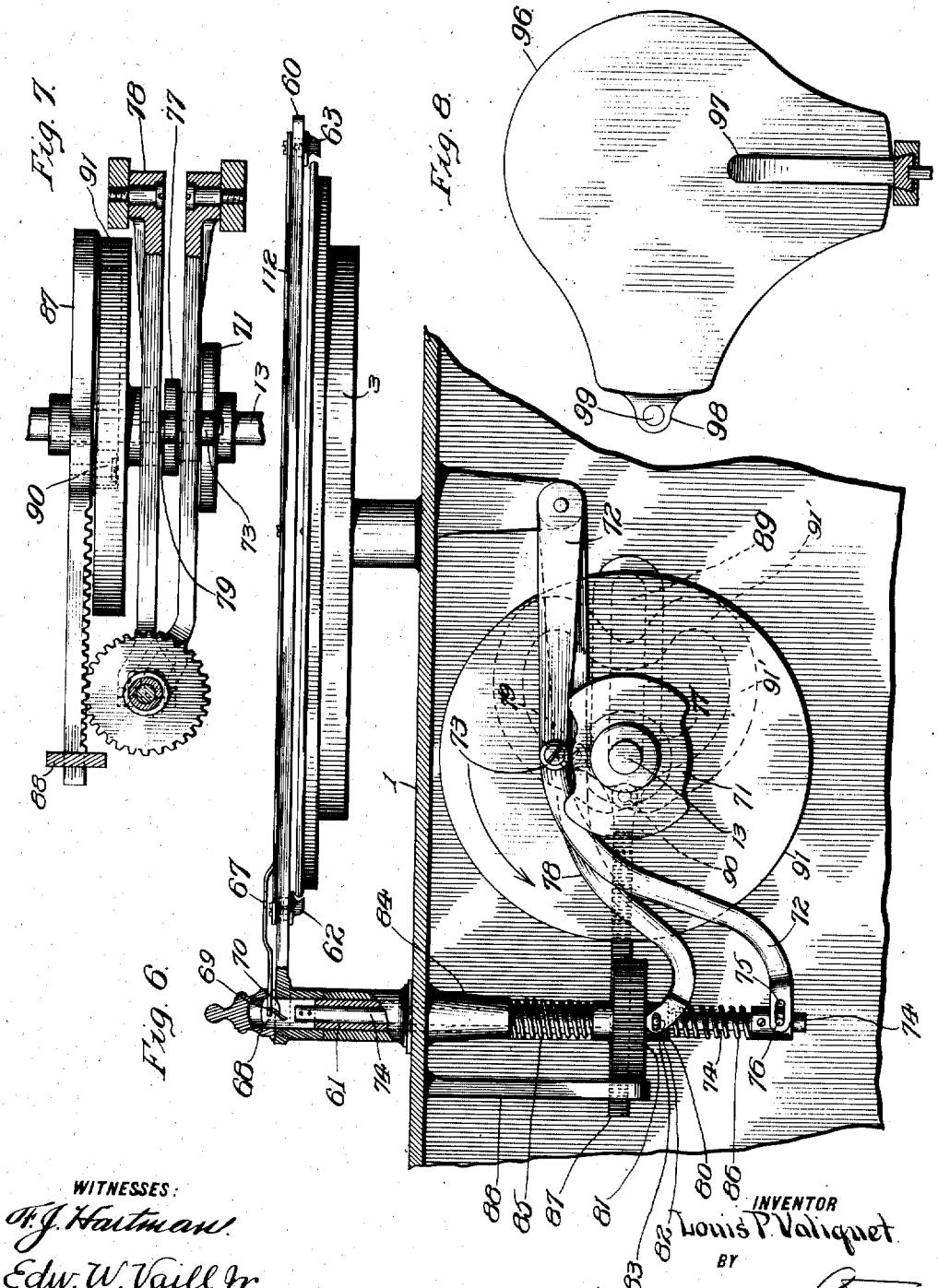

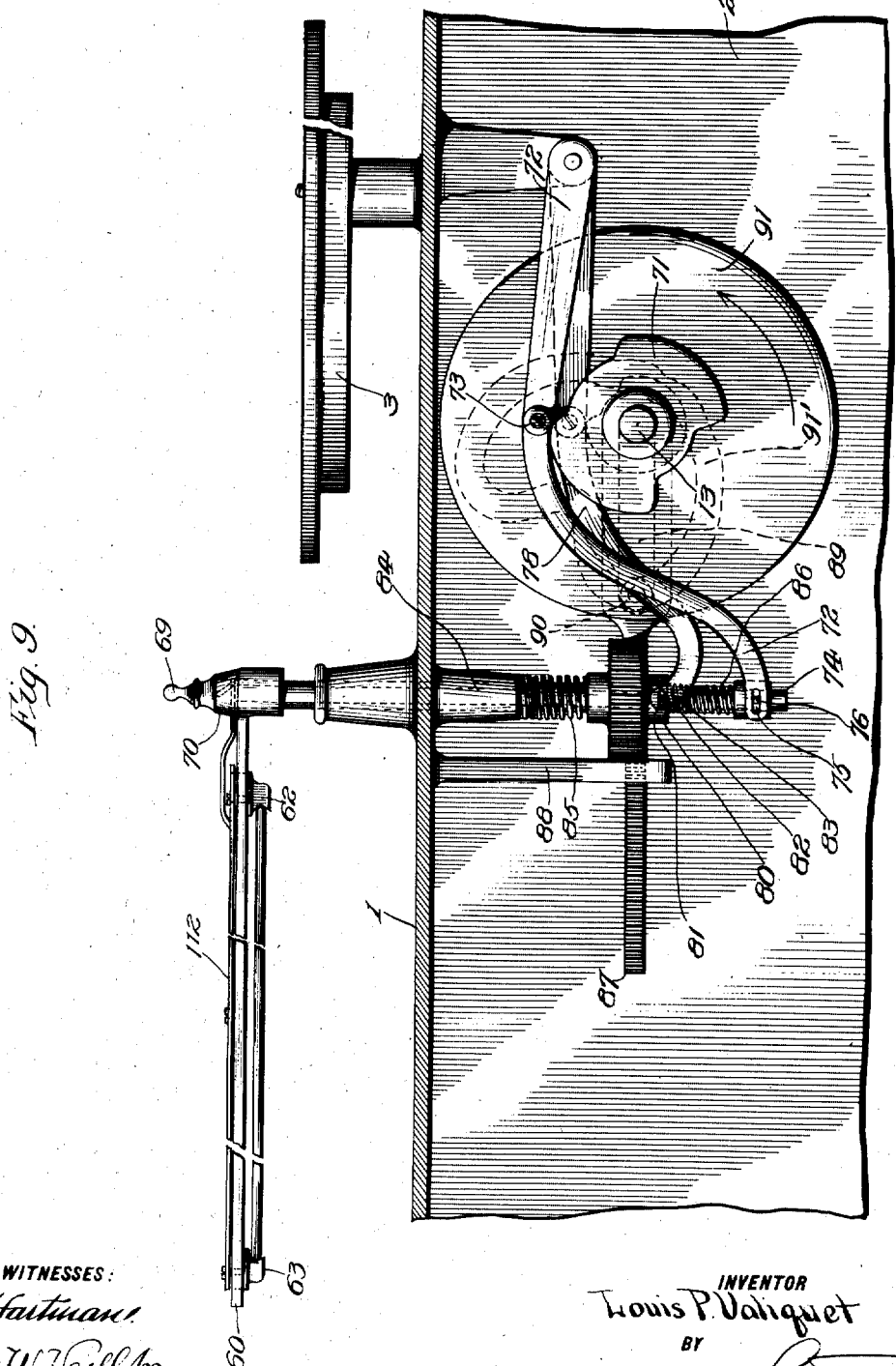

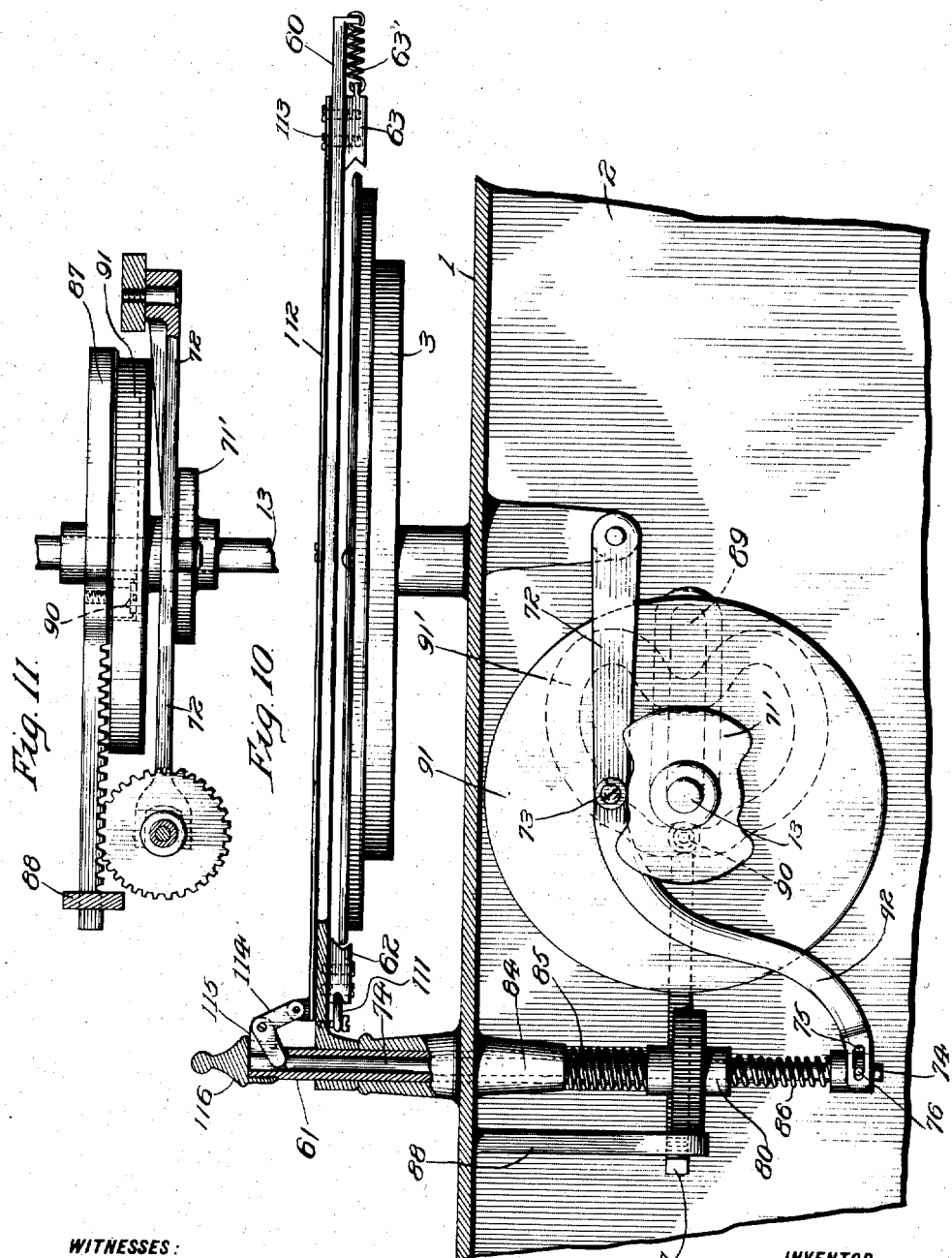

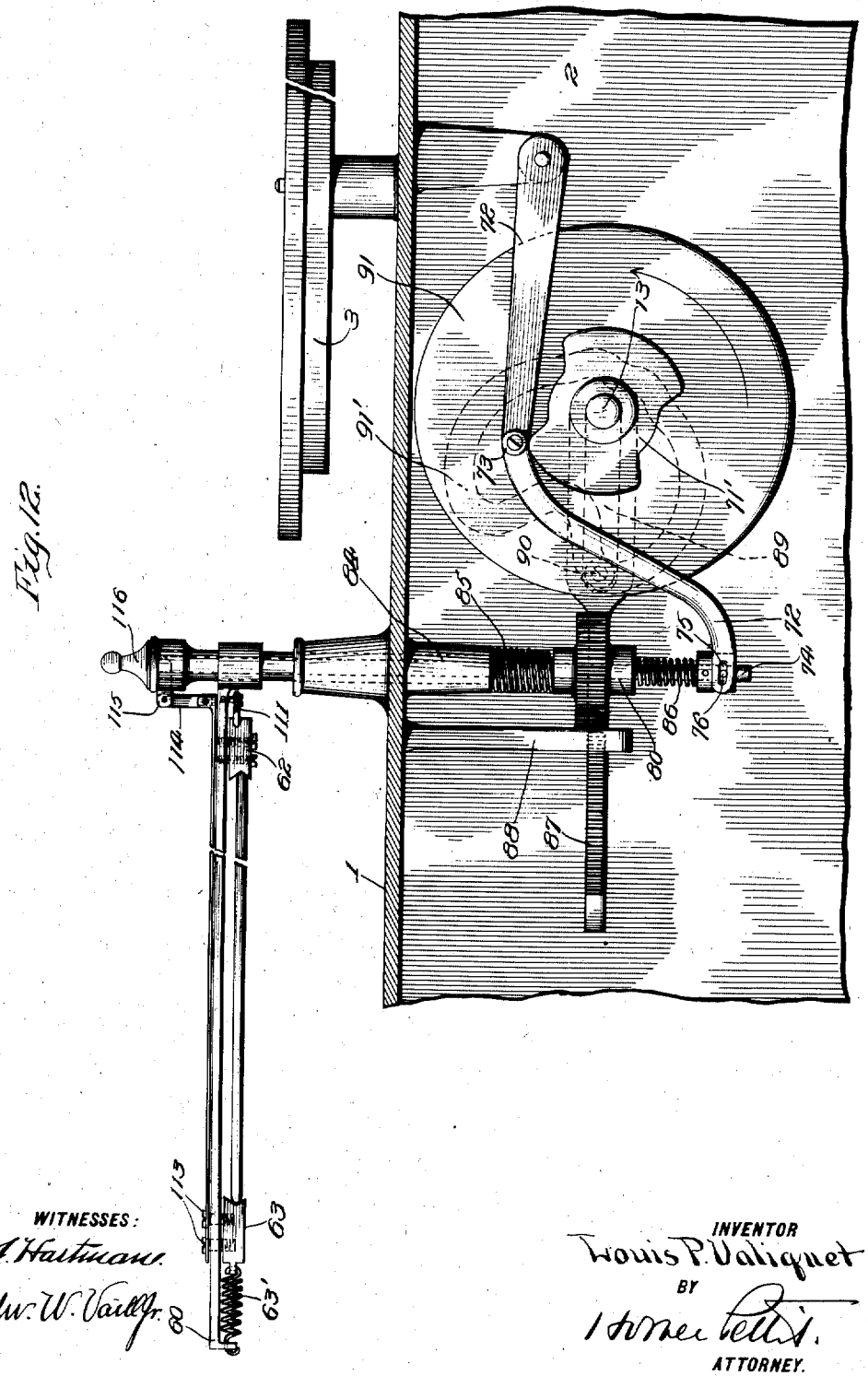

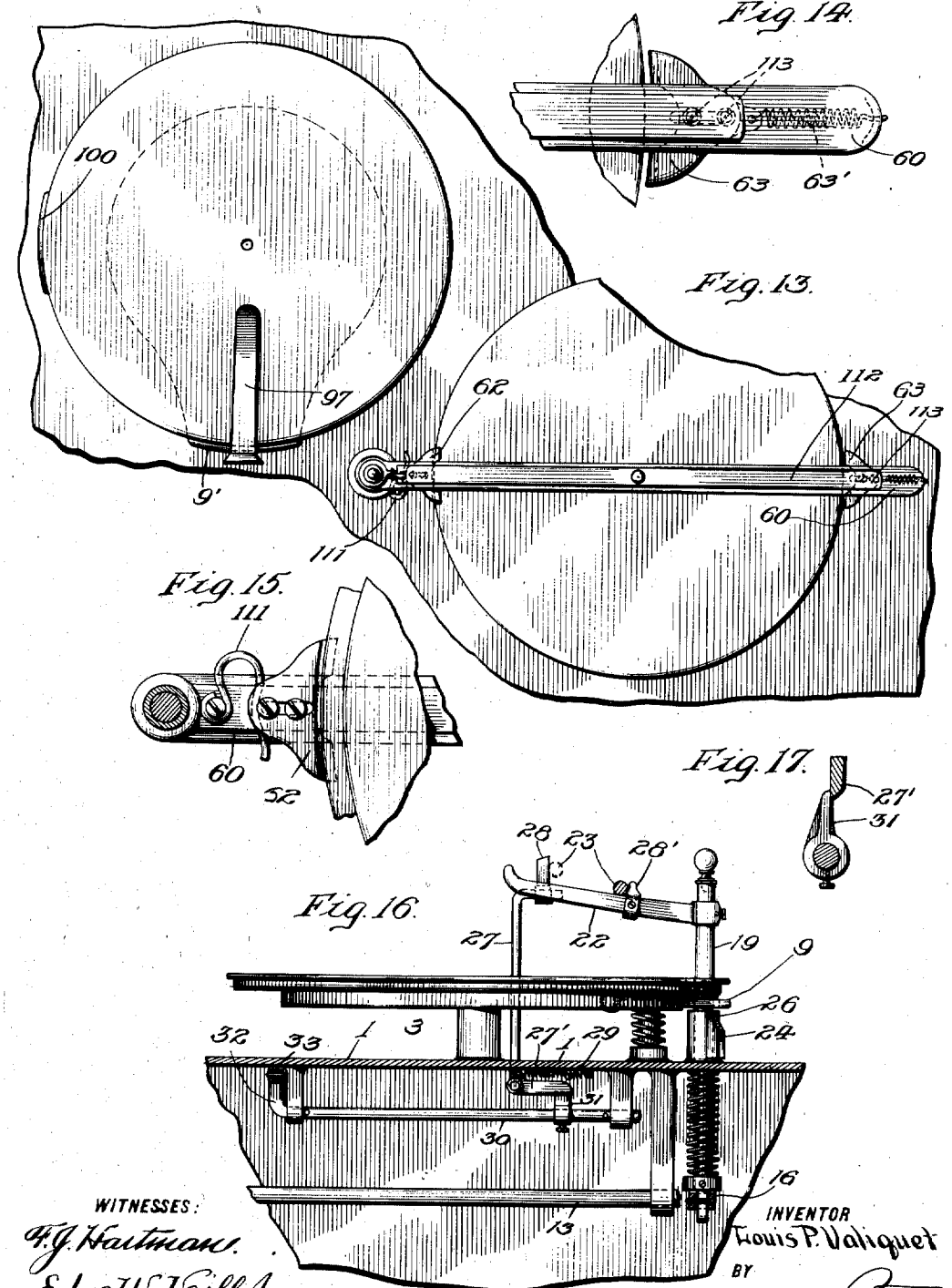

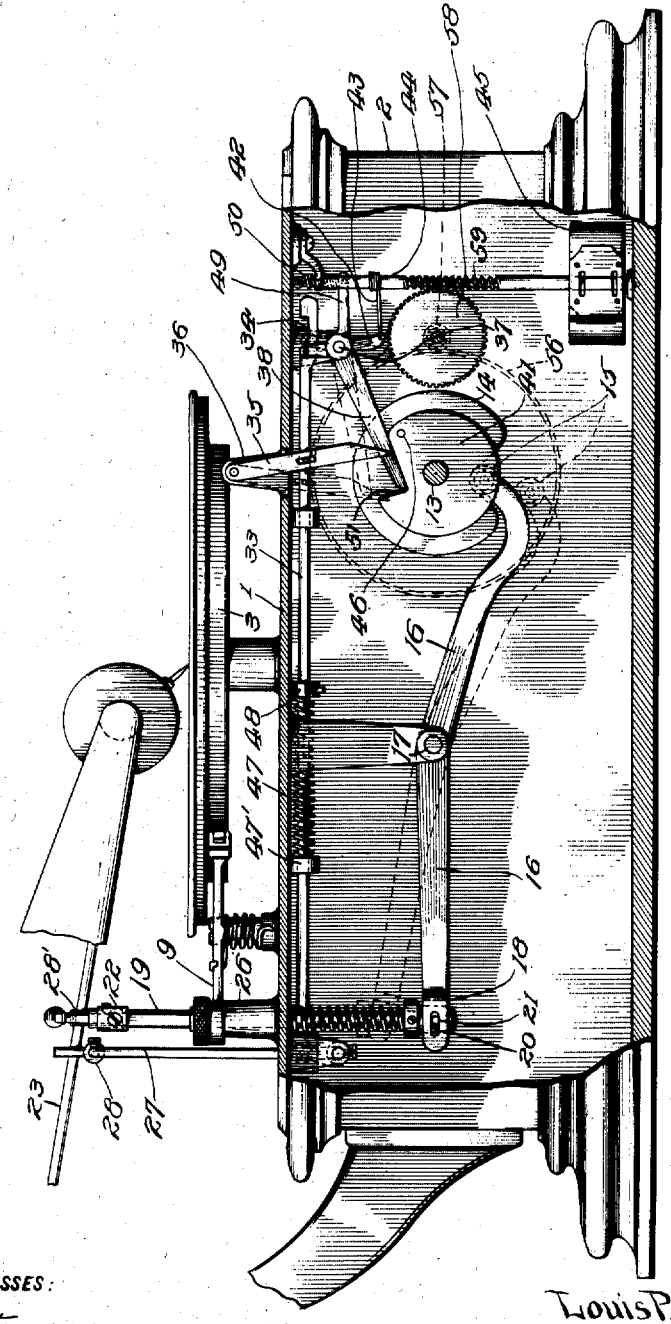

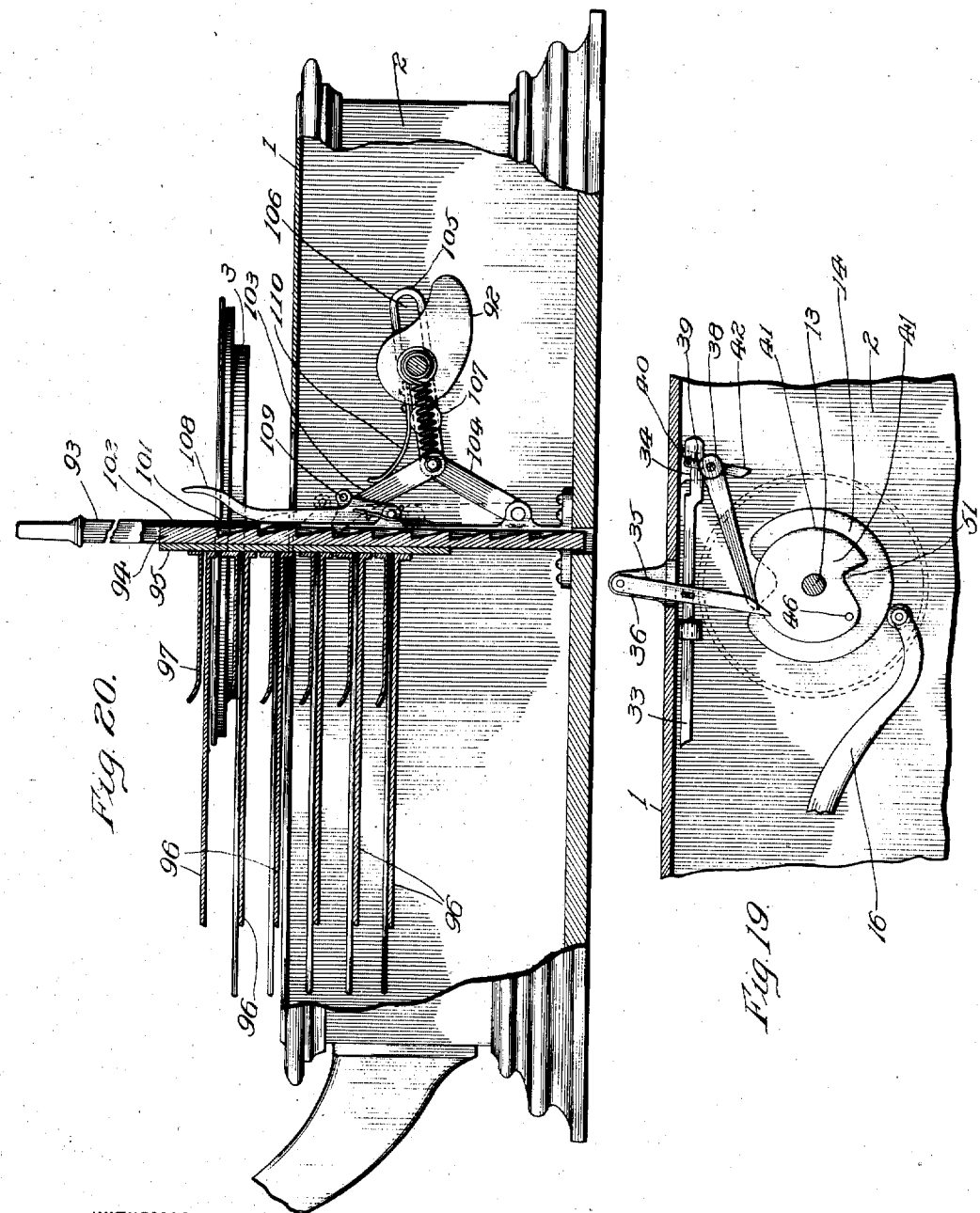

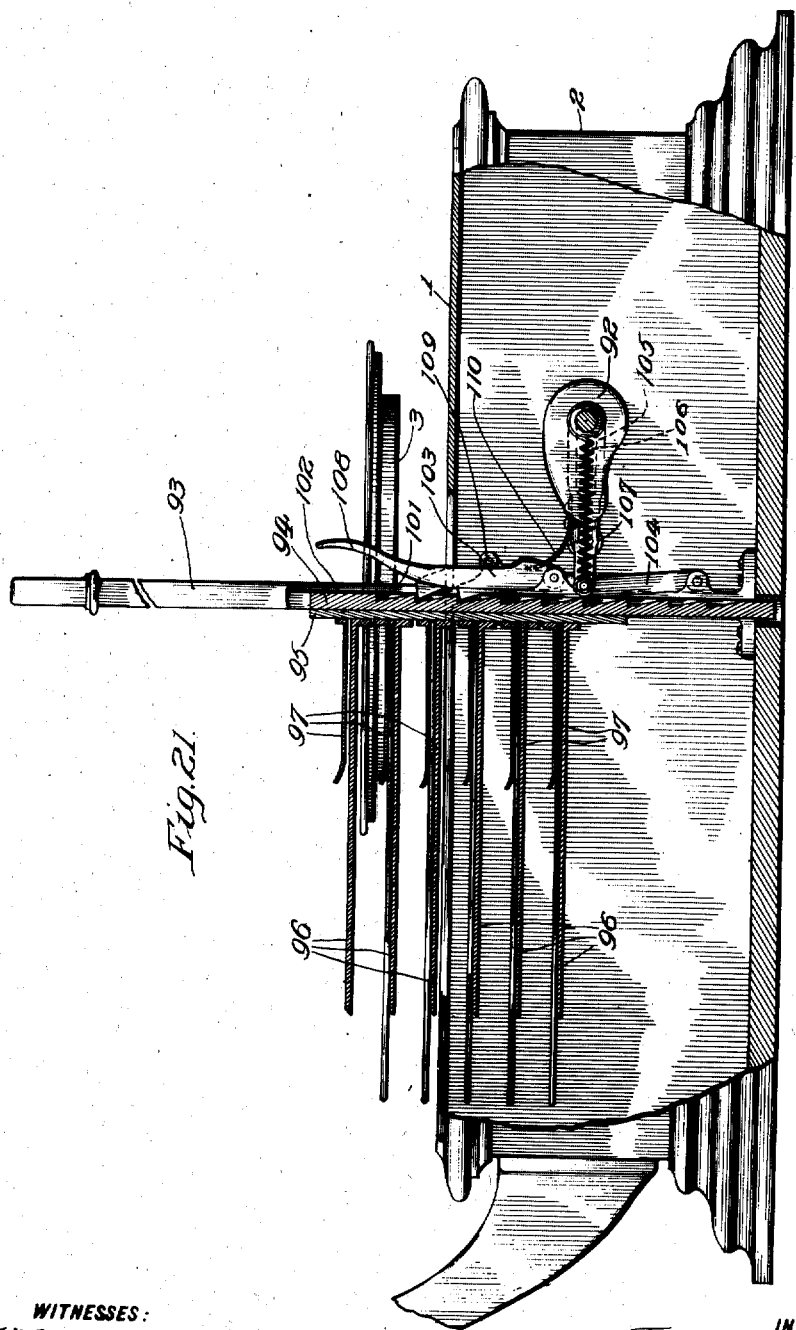

L. P. VALIQUET.
AUTOMATICALLY OPERATED TALKING MACHINE.
APPLICATION FILED OCT. 27, 1904.

1,224,979.

Patented May 8, 1917.
14 SHEETS—SHEET 14.

WITNESSES:
F. J. Hartman.
Edw. W. Vail Jr.

INVENTOR
Louis P. Valiquet.
BY
ATTORNEY.

UNITED STATES PATENT OFFICE.

LOUIS P. VALIQUET, OF NEW YORK, N. Y., ASSIGNOR TO VICTOR TALKING MACHINE COMPANY, A CORPORATION OF NEW JERSEY.

AUTOMATICALLY-OPERATED TALKING-MACHINE.

1,224,979.

Specification of Letters Patent.

Patented May 8, 1917.

Application filed October 27, 1904. Serial No. 230,202.

*To all whom it may concern:*

Be it known that I, LOUIS P. VALIQUET, a citizen of the United States, and a resident of the city of New York, State of New York, have invented certain new and useful Improvements in Automatically-Operated Talking-Machines, of which the following is a full, clear, and complete disclosure.

The main objects of this invention are to provide an improved automatic talking machine; to provide an improved automatic talking machine adapted for disk records; to provide an automatic talking machine having a record support, a rack or magazine for holding a plurality of records, and means for automatically and selectively transferring a record from the rack to the support and for returning the same to its original position in and with respect to the rack after it has been played, and to provide other improvements as will appear hereinafter.

Broadly, one embodiment of this invention comprises, as is hereinafter described in detail, a mechanism actuated by a main motor for reproducing sounds from a disk record, and a second mechanism actuated by an auxiliary motor for changing the records. The first mentioned of these mechanisms includes a turntable, a swinging tone arm, a sound box carried thereby and a main motor. The second mentioned of these mechanisms includes a record magazine, a record carrier arm provided with clamps and arranged to transfer records between the turntable and the magazine, and an auxiliary motor for actuating these parts.

The main motor first performs its function which continues throughout the reproduction of sound from the record and then starts the auxiliary motor, the main motor then being automatically stopped and allowed to remain stationary during the operation of the auxiliary motor and until the record has been replaced by a record from the magazine. The auxiliary motor is then automatically stopped and the main motor automatically and substantially simultaneously started, to repeat the cycle of operations.

The operation of this talking machine, in which each movement following the initial starting is brought about automatically, may be briefly summarized somewhat in detail as follows:—

When the parts of the mechanisms are in the initial or starting position, a sound record is in operative position on the turntable, both main and auxiliary motors are wound and the stylus of the sound box is in operative engagement with the record. The apparatus may then be started by manually turning a nut which releases the brake shoe and starts the main motor, thus rotating the turntable. After the stylus has traversed the extent of the record groove the reproducer arm encounters a stop, whereupon the auxiliary motor is set in motion, the arm and the stylus attached thereto are raised clear of the record, the turntable and the primary motor are simultaneously stopped and the reproducer arm is immediately gravitated toward the outer circumference of the turntable until the stylus is suspended directly above its original starting-point.

The auxiliary motor upon being started swings the record carrier arm from its initial position, just beyond the center of the turntable, toward the record magazine to a position immediately above the center of the record, where it holds the carrier arm stationary momentarily, while the clamps thereon are actuated to grip the record on the turntable, raises the arm and record until the latter is free of engagement with the projecting end of the turntable spindle, continues the movement of the carrier arm in its course toward the vacant magazine shelf in alinement therewith, stops it when directly above the shelf, lowers the arm until the record rests upon the shelf, actuates its clamps to release the record, retreats it to a point without the path of vertical movement of the record rack, raises the magazine to bring a second record into alinement with the turntable, swings the carrier arm to a position immediately above the second record, stops it when directly thereover, actuates its clamps to grip the new record, raises the arm and record until the latter is clear of the shelf, swings the arm and record gripped thereby to a position concentric with the turntable, stops the arm momentarily, lowers the arm and record until the latter rests upon the turntable and engages the projecting spindle end thereof, actuates its clamps to release the new record and then removes the arm to its original initial position, simultaneously lowering the reproducer arm and stylus until the latter engages in the groove of the new record, releases the turntable and its actuating motor, and substantially simultaneously stops itself. This completes one cycle of operation of the apparatus and it is repeated until all the records in the magazine have been played or until the turntable motor is stopped by manually operating the brake mechanism.

In the accompanying drawings Figure 1 is a side elevation of my improved automatic apparatus, showing the casing inclosing the operating mechanism cut away to expose the said operating mechanism; Fig. 2, an elevation similar to Fig. 1 but showing only the turntable motor, the starting and stopping mechanism, the sound box operating mechanism, and the mechanism for operating the record carrier; Fig. 3 is an enlarged elevation of the fan wheel or escapement, the cams and spring drum or motor for operating the main or cam shaft; Fig. 4, a plan view of the device as shown in Fig. 1, the reproducing parts being omitted; Fig. 5, a plan view similar to Fig. 4, but showing the record carrying arm in position over the record rack; Fig. 6, an elevation of the cams and that part of the apparatus which operates the record carrier arm; Fig. 7, a detail plan view of the cams and gearing shown in Fig. 6; Fig. 8, a plan view of one of the shelves of the record rack; Fig. 9 is an elevation similar to Fig. 6, but showing the rack carrying arm in the position in which it would be when over the record rack, said rack being omitted for clearness; Fig. 10, a modified form of mechanism for operating the record carrier; Fig. 11, a detail plan view of the cams and gearing shown in Fig. 10; Fig. 12 is an elevation similar to that shown in Fig. 10, but showing the rack carrying arm in the position in which it would be when over the record rack; Fig. 13 is a plan view of the modified form of record carrying arm shown in Figs. 10, 11, and 12; Figs. 14 and 15 are detail views of the clamps or jaws used in connection with the modified form of the record carrier showing the three figures last above mentioned; Fig. 16 is an elevation of the apparatus operated by the reproducer arm for starting and stopping the turntable motor, and for starting and stopping the operation of the record carrier and record rack; Fig. 17 is a sectional view of the latch or lock, which is actuated by the movement of the reproducer arm; Fig. 18 is a sectional view showing the mechanism referred to in connection with Fig. 16, and also showing the cams, latches, and other parts which operate the record carrying mechanism and the record rack; Fig. 19 is a detail elevation of the latches, cams, etc., shown in Fig. 18, but in different positions; Fig. 20 is a sectional view of the record rack and mechanism for raising and lowering the same; Fig. 21 is an elevation similar to Fig. 20, showing the record rack and parts connected thereto in a different position; Figs. 22 to 28, inclusive, are views showing the different cams used in my improved apparatus detached from the other parts.

Referring to the drawings, one embodiment of this invention comprises a suitable supporting plate or top 1 forming the top of a cabinet 2 for the apparatus and from which depend the principal supports for the bearings and other parts which comprise the operating mechanism. Hereafter these supports will not ordinarily be referred to specifically, for it is understood that they may be interposed at any suitable point without changing the nature of the invention. The cabinet or casing 2 is preferably made rectangular in shape, and of greater length than width. The casing contains in its right-hand portion, as shown in Fig. 2, a motor for rotating the turntable mechanism for reproducing the record, mechanism for moving the reproducer, a stopping and starting mechanism for the turntable, and mechanism for starting and stopping the cam shaft; and in its left hand portion, as shown in Fig. 1, the casing contains a motor for rotating the cam shaft for operating the record carrying arm, and for raising and lowering the record rack.

The motor for rotating the turntable may be of any approved or well known construction, and in this instance includes the usual spring drums, gearing, centrifugal governor, and the regulating brake. These parts have been omitted, except in Figs. 2, 4, and 5, for the sake of clearness. As shown in these figures, the device comprises a turntable 3, a turntable spindle 4, a spring drum 5, gearing 6 connecting the spring drum 5 and the turntable spindle 4, a centrifugal governor 7, and a regulator 8 for said governor.

The starting and stopping of the turntable motor is brought about primarily through the brake lever 9, which is fulcrumed upon the casing at 10, and carries on its inner end the brake shoe 11. Said fulcrum 10 is encircled by a coiled spring 12 which tends to hold said brake shoe 11 out of contact with the turntable 3. Although the lever 9 may be manually operated to start and stop the turntable, by means to be described later, yet the same is also automatically operated by the mechanism which raises and lowers the sound box in relation to the record, so that when the said sound box is out of engagement with the rack and while the record is being changed, the turntable will not revolve.

Figure 26:
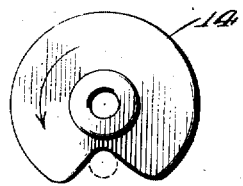
Figure 24:
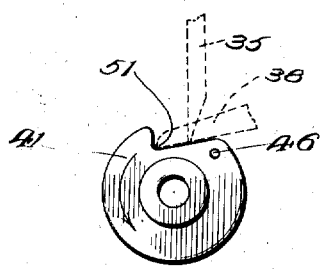
Figure 27:
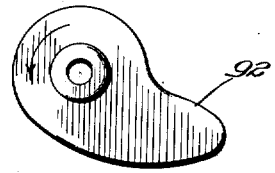
Figure 28:
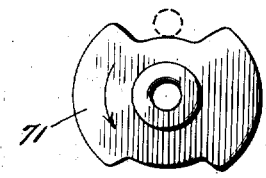

For thus automatically raising and lowering the sound box or sound reproducer there is fixed upon the main or cam shaft 13, which is operated in a manner hereinafter described, a cam 14 of the form shown in Fig. 26, and further shown in position in Fig. 18. The cam 14 coöperates with a follower 15, which is carried upon one end of a lever 16 which is fulcrumed as at 17 and its opposite end provided with a U-shaped portion 18 adapted to embrace the lower end of a vertical rod or spindle 19. Said U-shaped portion 18 is provided with slots 20, through which pass a pin 21 which connects said lever 16 with said rod 19. The upper end of the rod 19 carries an inclined arm 22, which is adapted to engage the under side of the reproducer arm 23. It will thus be seen that when the arm 22 is raised or lowered, by reason of its connection with the cam 14, the sound box will be removed from, or brought into contact with, the record.

For actuating the brake shoe 11 to engage or disengage the turntable 3, there is fixed upon one side of the vertical rod 19, an inclined projection 24, which is adapted to engage with the outer end of the brake lever 9, so that when the said rod 19 is raised said projection will contact with the brake lever 9, and thereby force the brake shoe 11 into engagement with the turntable. When the rod 19 is lowered, the spring 12 forces the brake shoe away from the turntable. The turntable is thus started and stopped at times corresponding with the putting of the sound box into and out of operation.

For starting and stopping the rotation of the turntable at other times than when automatically started and stopped by a vertical movement of the rod 19, there is provided an eccentric thumb nut or cam 25 loose on the rod 19, the lower portion of said nut being adapted to contact with the brake lever 9, to move the outer end of the same away from the rod 19 so as to throw the brake shoe 11 into engagement with the turntable 3. The eccentric thumb nut 25 rests upon the top of the sleeve 26, which projects from the plate 1 when the rod 19 is in its lower position. The sleeve 26 also has a slot in the side thereof which accommodates the inclined projection 24 attached to the rod 19. The inclined arm 22, which extends from the rod 19, is at such an angle to the horizontal that when the sound box and the reproducer arm 23 are adjacent the outer end thereof, a vertical movement of the rod 19 with said arm 22 will cause the reproducer arm 23 to slide down the incline of the arm 22, and thereby carry the said arm 23 with the sound box, or reproducer attached thereto, back to the starting position adjacent the outer edge of the record.

For starting the record carrier and operating the record rack, there is provided an upwardly extending arm 27, which is pivotally connected to the plate 1 and extends therethrough, projecting upwardly and downwardly therefrom, and having at its upper end a lug 28 rigid therewith and adapted to contact with the reproducer arm 23. The lower end of the arm or lever 27 is provided within the cabinet 2 with a projection 27' rigid therewith, and extending at right angles thereto, which, on its outer end is provided with an angular edge, as shown in Fig. 16. The upwardly extending arm 27 is held in its normal position by means of a coiled spring 29. Within the casing 2, and below the support plate 1, is suspended a longitudinally extending shaft 30, which has fixed adjacent one end thereof a latch or lug 31, and at its opposite end an arm 32 extending at right angles to the axis of the shaft. These parts are shown particularly in Figs. 16 and 17.

Pivotally connected with the arm 32 is a transversely extending rod 33, (see Fig. 18) which is supported in suitable bearings projecting from the end to the side of the plate 1, and is provided on its outer end with an elongated notch 34, and is also connected with a depending swinging arm 35, which is pivoted at its upper end to a support 36 carried by the plate 1. Supported by said plate 1 is a short, longitudinally extending shaft 37, (see Figs. 4 and 5) to which is fixed the arm 38, and also an upwardly extending lug 39, (see Fig. 19) which carries upon its outer end a pin 40 adapted to enter the elongated notch 34 in the rod 33. The arm 38 is adapted to engage the periphery of a cam 41 carried on the cam shaft 13. Adjacent the opposite end of the shaft 37 is a downwardly extending lug or latch 42, which is adapted to swing into and out of the path of a radial arm 43, carried on the shaft 44 of the fan wheel governor 45 which controls the speed of an auxiliary motor hereinafter described, for actuating the record changing mechanism. Upon the cam 41 is carried a transversely projecting pin 46, which is adapted to engage the end of the downwardly projecting arm 35, which is attached to the transverse rod 33 in a manner hereinafter to be described. Upon the rod 33, I place a coiled expansion spring 47, one end of which abuts against a downwardly extending bearing 47', and the other end against a collar 48 fixed on said rod 33. To hold the arm 38 in contact with the cam 41, I attach the radial extending arm 49 to the shaft 37, which is held under spring tension by the coiled spring 50, attached to the plate 1.

It is now evident that the starting of the cam or secondary motor is effected by the reproducer arm 23 when it swings into engagement at the inner end of its path across the record, with the contact or lug 28, thereby swinging the arm 27 about its pivot, and disengaging the arm 27' from the latch or lug 31. This will allow the spring 47 to act and move the rod 33 longitudinally forwardly or toward the right, as shown in Fig. 18, which will oscillate the shaft 37, and thereby remove the lug 42 from the path of the arm 43. The fan wheel 45 will then be allowed to rotate, which will cause the cam motor to come into action to revolve the cam shaft 13, and, therefore, the cam 41. As the cam 41 revolves the pin 46 will contact with the end of the downwardly extending arm 35, and move the same toward the left. This arm 35 being connected to the rod 33 will force the same also toward the left against the pressure of the spring 47, which will cause the shaft 30 to turn to its normal position, and again cause the latch 31 to engage the arm 27'. The cam 41 will then continue to revolve, but the latch 31 will still be held in its engaged position until again released by the reproducer arm. A continued movement of the cam 41 retains the lug 42 out of the path of the arm 43 until the recess 51, in the cam 41, allows the arm 38 to drop, which turns the shaft 37 and carries the lug 42 into the path of the arm 43, thus stopping the turn-table motor immediately after the auxiliary or cam motor has been started.

The cam motor consists of the usual spring barrel or drum 52, which has on its periphery a large gear 53, which is adapted to mesh with a pinion 54, carried on the winding shaft 55. The spring barrel 52 is carried on the main cam shaft 13, and the inner end of the spring (not shown) is, of course, connected to said shaft while its outer end is connected to the spring barrel. The fan governor 45 is connected with the cam shaft 13 by means of a train of gearing, including the spur gear 56, pinion 57, the spur gear 58, and the worm 59, carried on the governor shaft 44.

For the lifting of a record from the turntable, placing the same upon the record rack, engaging a new record and placing the same upon the turn-table, there is provided a pivoted record carrier arm 60, which is carried adjacent the upper end of a tube or bushing 61, and has slidably connected to the underside thereof two jaws, 62 and 63, which form a clamp to engage the periphery of the record. The jaws 62 and 63 are moved longitudinally of the arm 60 by means of two links or pitmen 64 and 65, which are connected to the opposite ends respectively of a transverse lever 66 which is pivoted intermediate of its ends on the central portion of the carrier arm 60. The lever 66 is reciprocated upon its fulcrum by means of a link 67, which is operated by a slotted cam plate 68, which is reciprocated vertically, in a manner hereinafter described, so that a pin 69 carried by the link or pitman 67 is made to traverse an inclined slot 70 in the cam plate 68.

For lifting the record carrier and swinging the same from the turntable to the rack, there is provided a cam 71 fixed on the cam shaft 13, and a pivoted arm 72 pivoted at one end to a fixed support and carrying intermediate its ends a cam follower 73. The outer end of the arm 72 is operatively connected with the lower end of a vertical rod 74, the upper end of which is rigidly attached to the slotted plate 68. The connection between the rod 74 and the arm 72, comprises a yoke which is preferably in the form of a U having slots 75 which engage a transverse pin 76. The cam 71 has two depressed portions, which provide for a releasing action of the jaws 62 and 63, twice during a single revolution of the cam, or while the turntable is in operation to reproduce a record, and while the record rack is being lifted. A vertical movement of the rod 74 will therefore cause the end of the link 67 to be moved longitudinally, and thereby draw the clamps 62 and 63 together.

After the record on the turn-table has thus been engaged by said clamps, it is first lifted a short distance above the table. This is accomplished by lifting the record carrier by means of a cam 77 which coöperates with the pivoted arm 78 which carries a cam follower 79. The end of the arm 78 is also provided with a U-shaped portion having slots 80. The rod 74 passes through the tube or bushing 61, above referred to, and to the lower end of said bushing 61 is secured a gear 81 both of which rest upon a loose collar 82 on the rod 74, which collar 72 carries transverse pins 83 which engage the slots 80 in the end of the arm 78. A fixed sleeve 84, which projects downwardly from the plate 1, serves to hold the bushing 61 in position and forms a bearing therefor. Between the lower end of the sleeve 84 and the gear 81 is a coiled expansion spring 85 which tends to depress said gear 81, and bushing 61, and also to keep the arm 78 in operative position in relation to the cam 77. Between the collar 82 and the lower end of the rod 74 is a coiled spring 86 which tends to depress the arm 72, and also to keep its follower 73 in contact with the cam 71. Meshing with the gear 81 is a horizontally slidable rack 87 carried in the depending supporting post 88, and having at its inner end an enlarged portion provided with a longitudinal slot 89. Adjacent one end of said slot is fixed a follower 90 which is adapted to engage a cam slot 91' in the face of the disk 91. It will now be seen that as the cam 77 revolves, the arm 78 will be raised at intervals carrying with it the gear 81 and the sleeve 61. This will raise the record carrier arm 60 by reason of the fact that the same is attached to the bushing 61 at its upper end. When said arm has been raised, the rack 87 is then moved longitudinally by the movement of the follower 90 in the cam slot 91' in the disk 91. Longitudinal movement of the rack 87 will turn the gear 81, and consequently the sleeve 61 and the arm 60, until the latter comes over the requisite shelf or support of the record rack. The jaws then release the record after which the arm moves out of the path of the rack while the latter is being raised, to bring another shelf opposite the record carrying arm 60. The arm then moves over this shelf, the record is gripped by the jaws 62 and 63, and is carried by the arm 60 to a position above the turntable. The arm is then lowered and the turntable released, after which, reproduction of the record may begin.

One complete revolution of the cam shaft accomplishes all these operations and the cams are so designed that the parts will be accurately timed, and coöperate to produce the desired result.

The mechanism for raising and lowering the record rack (see Figs. 19 and 20) is actuated by a cam 92, which is located adjacent to or opposite a fixed vertical guide or support 93 for the record rack. The record rack comprises a vertical shelf bar 94, which is dovetailed in cross section, and fits within a similarly shaped groove in the support 93. The shelf bar 94 carries upon its narrow face a vertical plate or support 95, and a series of record shelves 96. Above each shelf is fixed a leaf spring 97 for the purpose of holding a record frictionally in position upon the shelf. Each of the shelves 96 is preferably substantially pear-shaped, provided at one side with a projection 98. These projections are arranged in vertical alinement and slidably engage a vertical post or rod 99, passing therethrough which serves as additional means for holding the shelves 96 in the requisite position, the shelves being allowed to slide vertically on said rod. Instead of the rod 99 for guiding the shelves of the record rack, a vertical guide 100, may be attached to the plate 1 of the casing of the apparatus, as shown in Figs. 1, 4 and 5. In this form of guide, of course the projections upon the shelves are omitted.

The shelf bar 94 is provided on one side with a series of ratchet teeth 101, and the support 93 is provided at one side with a slot 102 to allow the free end of a suitable pawl 103 to engage said ratchet teeth. This pawl, pivoted at its other end to one end of a link 104, the other end of which is pivoted to the fixed support 93, forming a toggle. The joint of the toggle 103 and 104 is connected with the cam 92 by a pitman 105, which has in one end a slot 106 adapted to embrace the shaft 13. A spring 110 attached to the pitman 105 bears against the pawl 103 to keep the same normally in position in engagement with the teeth 101 of the rack 94. Upon one side of the pitman 105 is a cam follower 107, which, in connection with the cam 92, moves the pitman 105 longitudinally, and operates the toggle composed of the bars 103 and 104 to raise the rack bar 94.

To permit the rack bar and record magazine carried thereby to be lowered to its starting position, and also to allow any record to be selected or played the second time, a latch 108 is provided, which is pivoted to the rack support 93, and which is adapted to engage a pin 109 carried on the pawl 103. By manually moving the latch 108 away from the support 93, the pawl 103 will be withdrawn from engagement with the teeth of the rack bar 94. This will allow the record rack to be lowered or placed in any desired position, so that any record contained in the rack may be reproduced as desired.

The parts thus far described constitute one form of a complete operative device, but of course it is obvious that the same may be modified in many ways, so that the same result may be produced, for instance the record carrier may be simplified and constructed in the form shown in Figs. 10, 11, 12, 13, 14, and 15. This modified form of record carrier comprises an arm 60, which is attached to a sleeve 61, as before described, and two jaws 62 and 63 are slidably mounted upon said arm 60 as hereinbefore described. In this case, however, only one jaw 63 is positively operated, the other jaw 62 being held yieldingly in position by a compression spring 111, which is fixed at one end to the underside of the arm 60. The jaw 63 is positively operated by being connected to a longitudinally movable link or pitman 112, by means of screws 113, which pass through a suitable slot in the arm 60, and by a spring 63', which tends to draw said jaw 63 outward. The inner end of the pitman 112 is pivotally connected to one arm of a bell crank lever 114, which is pivoted to an extension 115 on the sleeve 61. The inner arm of the bell crank lever 114 projects through a slot in the sleeve 61, and contacts with the upper end of the vertical rod 74. In this form the cam, previously indicated by the numeral 77, and the arm 78, are made unnecessary, and the cam 71 and arm 72 perform the function thereof in connection with the parts last above described. All the other features of the mechanism for lifting the record carrier, and turning the same upon its vertical axis, being the same as the corresponding parts previously referred to in connection with the first form.

In this modified form of a record carrier, however, when the arm 72 is raised by the cam 71, the vertical rod 74 is first raised against the action of the spring 86. This operates the bell crank lever 114, and draws the jaw 63 inward so as to clamp the record between said jaw and the jaw 62. As the cam 71 continues this movement, and raises the arm 72 still farther the vertical rod 74 will force the inner arm of the bell crank lever 114 against the cap 116, which covers the end of the sleeve 61. This sleeve 61, together with the parts attached thereto, will then be raised, thus removing the record from the turntable. The cam 91 then comes into action through the rack 87, rotates the gear 81 and the sleeve 61, to which said gear is attached, to swing the record carrier to its position over the record rack in a manner exactly similar to that hereinbefore described.

The operation of this improved automatic talking machine is as follows: Supposing the sound box to be in position adjacent the outer margin of the record on the turntable 3, the stylus or needle having its point in place in the record groove and the parts of the mechanism for controlling the reproducing devices being in the position indicated in Fig. 18; and also supposing that the parts are all at rest and that the brake shoe 11 is in contact with the turntable 3, by reason of the position of the cam nut 25; it is then only necessary to turn the said nut 25 manually so that the brake shoe will be allowed to be withdrawn from contact with the turntable by the spring 12 acting upon the brake lever 9. The turntable will then revolve in the usual manner, and the needle will traverse the whole width of the record until the reproducer arm comes in contact with the projection or stop 28 carried by the arm 27. This will release the latch or lug 31, and thereby turn the shaft 30, which moves the rod 33 longitudinally toward the right as shown in Fig. 18. The longitudinal movement of the rod 30 acts upon the pin 40, and thereby raises the arm 38 out of the notch in the cam 41, and also releases the arm 43 so that the cam motor is allowed to rotate the shaft 13 and all of the cams carried thereby.

It will be seen, at this point, the record carrier and record rack operating mechanism are thrown into operation, but before continuing to a description of such mechanism the action of the mechanism for operating the reproducer and parts connected thereto will be continued with. As the cam 14 has now been started by the cam motor so as to revolve in anti-clockwise direction, as shown in Fig. 18, the lever 16 will be oscillated and its outer end raised. This will raise the vertical rod 19, and, consequently, the arm 22, which will then contact with and raise the reproducer arm 23, shown by dotted circle in Fig. 16. The supporting arm 22 being inclined, the reproducer arm and parts will slide from the first position above mentioned toward the lower end of said supporting arm until arrested by contact with the stop 28', which is so adjusted as to place the stylus of the sound box or reproducer above the beginning or outer end of the record groove.

As the cam 14 continues to revolve, the sound box is still held at a sufficient distance above the record to allow the said record to be removed and another one placed in position upon the turntable, and the sound box is not again lowered until the follower 15 again enters the notch in the cam 14, during which time the changing of the record has been completed.

Now returning to the point at which the cam shaft is first started, it will be seen that as the cam 41 is rotated the follower arm 38 will be maintained in its raised position by reason of its contact with the portion of the cam adjacent the pin 46. This will keep the arm 42 out of contact with the projecting arm 43 on the governor shaft 44 until the notch has again allowed the follower arm 38 to drop. Meanwhile, the pin 46 has been rotated with the cam 41, and almost immediately after starting contacts with the lower end of the swinging arm 35. This moves the rod 33 in the opposite direction to that above described, or in other words, from right to left, as shown in Fig. 18. This forces the lug 31 past the latch 27', thereby setting stop 28 in such position as to be ready for another contact with the reproducer arm 23. In this manner it is seen that after the cam motor is once started, the starting mechanism is immediately reset, while the motion of the cams themselves permits the motion of the cam motor until the follower arm 38 drops into the notch in the cam 41.

When the cam shaft 13 begins to rotate, and while the operations last above described are taking place, the record carrier is being operated to transfer the record just used from the turn table to the correct shelf in the record rack, and to substitute another record therefor on the turntable. When not in use the record carrier arm 60 is in the position shown in Fig. 4, that is, at one side of the center of the turntable so as to allow the sound box or reproducer to have a free path along a radius of the record. The first motion of the arm 60 therefore is to be moved so that the same is brought to a stop above the diameter of the record. This is accomplished by the shape of the cam groove 91' in the cam 91, and particularly shown in Fig. 22, immediately adjacent the dotted circle indicating the follower 90.

At this point the record carrier arm 60 is at rest for a short time while the jaws 62 and 63 are moved to engage the record disk. This is accomplished by the connection between the arms 72 and said jaws, as above described. As the follower 73 on the arm 72 is raised, the jaws are first moved toward each other and then a continued motion of the follower 73 onto the larger arch-shaped surface of the cam 71, together with the upward movement of the sleeve 61 caused by the follower 79, moving onto the outer arch-shaped surface of the cam 77, lifts the arm 60, together with the record disk.

At this point the arm 60 is swung around in the direction of the record carrier, by reason of the movement of the follower 90 in the cam groove 91' until the record is brought above its shelf. The jaws 62 and 63 are then made to disengage from the record, and the record arm is swung out of the path of the record rack, which is then raised one notch by reason of the cam 92 then coming into action to operate the pawl 103. The carrier arm is then returned to position within the record rack above the next record disk, which is immediately gripped by the jaws 62 and 63, and removed from the rack and placed upon the turntable in a manner just the reverse of that above described in removing the record from the turntable. At this point the sound box and other reproducing parts are lowered by reason of the follower 15 entering the notch in the cam 14, and the cam motor is stopped by reason of the arm 38 entering the notch in the cam 41. The turntable motor is then started because the rod or post 19 has been lowered carrying with it the inclined projection 24 which allows the spring 12 to move the brake lever 9 so that the brake shoe 11 is disengaged from the turntable.

This succession of operations or movements is repeated until all the records carried by the rack have been reproduced, or until the eccentric nut 25 has been moved to force the brake shoe 11 permanently into contact with the turntable.

It is to be understood that this invention is not limited to the exact form and arrangement of parts herein described, since the same may be changed by the substitution of mechanical equivalents, by the modification of the construction or arrangement or the omission of some of the parts, by the addition of auxiliary devices, or by making other changes without departing from the spirit of the invention or the scope of the appended claims.

Having fully described this invention, I claim and desire to protect by Letters Patent of the United States:

1. A talking machine comprising a support for talking machine records, a magazine for holding talking machine records, and means for automatically clamping and moving a talking machine record from said magazine to said support.

2. A talking machine comprising a support for talking machine records, a magazine for talking machine records, and means for automatically gripping and moving a talking machine record from said magazine to said support and returning the same to said magazine.

3. A talking machine comprising a support for talking machine records, of actuating means therefor, a magazine for holding talking machine records, and means actuated by said actuating means for moving any one of said talking machine records selectively from said magazine to said record support.

4. A talking machine comprising a support for talking machine records, actuating means therefor, a magazine for holding talking machine records, and means actuated by said first mentioned means for moving any one of said talking machine records selectively from said magazine to said record support and returning the same to said magazine.

5. In a talking machine, the combination with a sound reproducer, of a record carrier, a receptacle for the records, and means actuated by the movement of said reproducer for starting the operation of said record carrier and record receptacle.

6. In a talking machine, the combination with a movable reproducing mechanism, of a record carrier, a storage receptacle for the records, a latch operated by the motion of said reproducing mechanism for starting the operation of said record carrier, and means for resetting said latch and means for stopping the operation of said record carrier and storage receptacle.

7. In a talking machine, the combination with a movable sound reproducer, a rotary record support and a motor for operating the same, of a record carrier, a storage receptacle coöperating therewith, a latch operated by the motion of said reproducer for starting the operation of said record carrier and storage receptacle, and means mechanically connected with said record carrier and storage receptacle for starting and stopping said motor.

8. In a talking machine, the combination with a rotary record support, of a motor therefor, a record carrier, a receptacle for records coöperating therewith, a sound reproducer, means actuated by said reproducer for starting the operation of said record carrier and said receptacle, driving means for said record carrier and receptacle, and means connected with said driving means for stopping the operation of said motor.

9. In a talking machine, the combination with a rotary record support, of a motor therefor, a sound box, means for automatically raising and lowering said sound box, a record carrier, a record receptacle, means for operating said carrier and receptacle, means controlled by said sound box for starting said carrier and receptacle operating mechanism, and means operatively connected with said sound box for starting and stopping said motor for said rotary record support.

10. In a talking machine, sound reproducing mechanism, means for automatically operating said reproducing mechanism, comprising an inclined support, a cam operatively connected with said support, means controlled by the position of said reproducing mechanism for starting the rotation of said cam, and means for stopping the rotation of said cam.

11. In a talking machine, sound reproducing mechanism, means for automatically operating said reproducing mechanism, comprising an inclined support, a cam operatively connected with said support, means controlled by the position of said reproducing mechanism for starting the rotation of said cam, and means controlled by the rotation of the cam mechanism for stopping said cam.

12. In a talking machine, sound reproducing mechanism, means for automatically operating said reproducing mechanism, comprising an inclined support, a cam operatively connected with said support, a shaft upon which said cam is mounted, means for driving said shaft, a latch controlled by the position of said reproducing mechanism for starting the rotation of said cam, and means connected with said cam shaft for stopping the rotation of said cam.

13. In a talking machine, the combination with sound reproducing mechanism of means for automatically operating said reproducing mechanism, comprising a talking machine motor, a vertically movable support, means controlled by the position of said reproducing mechanism for raising and lowering said support, means for starting and stopping said talking machine motor operatively connected with said support, and controlled by the position thereof.

14. In a talking machine, sound reproducing mechanism, means for automatically operating said reproducing mechanism, comprising a talking machine motor, a vertically movable support, means for starting and stopping said talking machine motor, comprising a projection carried by said support and operatively connected with said motor.

15. In a talking machine, a turntable, sound reproducing mechanism, means for automatically operating said reproducing mechanism, comprising a vertically movable support, an inclined projection carried by said support, and a brake lever adapted to engage said turntable and to be oscillated by said inclined projection.

16. In a talking machine, a turntable, means for automatically placing the records upon and removing the same from said turntable, comprising a movable support, means carried by said support adapted to clamp the records, means for moving said support to and away from said turntable, and a receptacle adapted to receive the records when disengaged from said support.

17. In a talking machine, a turntable, means for automatically placing the records upon and removing the same from said turntable, comprising a movable support, jaws carried by said support, means for drawing said jaws together to engage the record, means for moving the said support vertically, means for moving said support laterally to and away from said turntable, and a receptacle adapted to receive the records when disengaged from said automatically operated means.

18. In a talking machine, a turntable, means for automatically placing the records upon and removing the same from said turntable, comprising a pivoted carrier arm or support, jaws carried by said arm, means for drawing said jaws together for engaging the records, means for moving said support to and away from said turntable, and a receptacle adapted to receive the records when disengaged from said support.

19. In a talking machine, a turntable, means for automatically placing the record upon and removing the same from said turntable, comprising a horizontal arm, jaws carried by said arm, means for causing said jaws to engage the record, a sleeve to which said arm is attached, a rod passing through said sleeve and forming part of means for operating said jaws, and a receptacle adapted to receive the records when disengaged from said automatically operated means.

20. In a talking machine, a turntable, means for automatically placing the records on and removing the same from said turntable, comprising a swinging arm, a sleeve to which said arm is attached, a rod passing through said sleeve, means carried by said arm for clamping the record thereto, said means comprising a jaw slidable longitudinally of said arm and being operatively connected with said rod, means for moving said rod, and a receptacle adapted to receive the records when disengaged from said arm.

21. In a talking machine, a turntable, means for automatically placing the records upon and removing the same from said turntable, comprising a swinging arm, a rotatable sleeve upon which said arm is mounted, a rod passing through said sleeve, means carried by said arm for engaging the record, said means comprising a jaw slidable upon said arm, connections between said jaw and said rod, means for moving said rod, means for rotating said sleeve, and a receptacle adapted to receive the records when disengaged from said arm.

22. In a talking machine, a turntable, means for automatically placing the record upon and removing the same from said turntable, comprising a swinging arm and a sleeve upon which said arm is mounted, a rod passing through said sleeve, means carried by said arm for engaging the record, comprising a jaw slidable upon said arm, connections between said jaw and rod, means for moving said rod vertically, and a receptacle adapted to receive the records when disengaged from said arm.

23. In a talking machine, a turntable, means for automatically placing the records upon and removing the same from said turntable, comprising a swinging arm, a sleeve upon which said arm is carried, a gear also carried by said sleeve, a longitudinally movable rack meshing with said gear, means for moving said rack to swing said arm, a vertical rod passing through said sleeve, means carried by said arm for clamping the record, connections between said rod and said clamping means, means for moving said rod vertically to clamp the record, means for moving said sleeve vertically to raise or lower said arm, and a receptacle adapted to receive the records when disengaged from said automatically operated means.

24. In a talking machine, a turntable, means for automatically supplying records to said turntable and removing the same therefrom, comprising a swinging arm, means on said arm adapted to clamp the record, a record rack having a series of compartments or divisions for the records, means for moving said rack to bring the divisions thereof successively opposite the record carrier, and means for swinging said carrier to and from said turntable into the divisions of said rack for swinging the same clear of said rack during the movement of said rack, and for swinging the carrier into said rack to engage another record.

25. In a talking machine, a turntable, means for automatically supplying the records to said turntable and removing the same therefrom, comprising a record carrier, a record rack coöperating therewith having a series of divisions for the records, a toothed bar attached to said rack, pawls engaging said toothed bar, one of said pawls being pivoted at a fixed point, a toggle connected to the other of said pawls, and means for operating said toggle to raise the record rack.

26. In a talking machine, a turntable, sound reproducing mechanism, means for operating said reproducing mechanism to make the same active and inactive and to return the same to the starting position, a record carrier for clamping and placing records upon and removing the same from said turntable, a record rack or receptacle, a series of cams for operating said parts, a shaft upon which said cams are carried, means for rotating said cam shaft, and mechanism connected with said reproducing mechanism for throwing into action said rotating means, and means operated by the rotation of said shaft to stop said rotating means.

27. In a talking machine, a turntable, sound reproducing mechanism, means for operating said reproducing mechanism to make the same active and inactive in relation to the records, a record carrier for placing the records upon and removing the same from said turntable, a record rack or receptacle for the records, a series of cams operatively connected with said parts, a shaft upon which said cams are carried, means for driving said cam shaft, a governor connection with said driving means, a stop adapted to arrest the movement of said governor, connections between said stop and said reproducing mechanism, and means operated by said cam shaft to operate said stop to arrest the movement of said governor.

28. In an automatically operated talking machine, sound reproducing mechanism, a series of cams for operating the different parts, a shaft upon which said cams are carried, means for driving said shaft, a governor for said driving means, a stop for said governor, a latch adapted to be released by said sound reproducing mechanism to remove said governor stop, a cam carried by said shaft having a follower connected with said stop, said cam being adapted to move said stop to arrest the rotation of said governor.

29. In a talking machine, a turntable, sound reproducing mechanism, means for operating said reproducing mechanism to make the same active and inactive, a record carrier for placing the records upon and removing the same from said turntable, a record rack or receptacle, a series of cams for operating said parts, a shaft upon which said cams are carried, means for driving said cam shaft, a stop for arresting the motion of said driving means, and a latch connected with said stop and operated by the movement of said sound reproducing mechanism for removing said stop, a follower connected with said stop and adapted to operate the same to arrest the motion of the driving means, and connections between one of said cams and said latch for resetting the same.

30. In an automatically operated talking machine, a motor, sound reproducing mechanism, cams for controlling the operation of the parts thereof, a cam shaft upon which said cams are mounted, driving mechanism for said shaft, a stop for said driving mechanism, connections between said reproducing mechanism and said stop adapted to remove the latter by the motion of said reproducing mechanism, cam operated means for resetting said stop, and cam operated means for controlling the action of the talking machine motor.

31. In a sound reproducing machine, the combination of a record support, a record thereon and rotated thereby and horizontally movable means for automatically lifting the record from the support, said means being also automatically moved to swing said record horizontlly.

32. In a talking machine, the combination with a horizontal turntable, of a pivoted record carrier and support and means for swinging said carrier and support in a horizontal plane into and out of position over said turntable.

33. A machine comprising a magazine adapted to support a plurality of sound records, a rotary record support in proximity to said magazine, means to actuate said support, and means actuated by said actuating means to shift a record from the magazine to the support and then to return the record from the support directly to its original position in the magazine.

34. In a sound reproducing machine, the combination with a rotatable talking machine record support, of means for supporting a series of talking machine records, and means arranged to be operated to clamp and shift a talking machine record horizontally from the series to the support.

35. In a sound reproducing machine, the combination with a rotatable talking machine record support, of means for supporting a series of talking machine records, and means arranged to be operated to clamp and shift a talking machine record from the support to the series.

36. In a sound reproducing machine, the combination with a rotatable talking machine record support, of means for supporting a series of talking machine records, and means arranged to be operated to clamp and shift a talking machine record from the series to the support and from the support to the series.

37. In a talking machine, the combination with a talking machine record support, of means mounted upon the talking machine structure for clamping a talking machine record and moving said record from said support.

38. In a sound reproducing machine, the combination with a rotatable talking machine record support, of a magazine for sounds records, means for automatically clamping and transferring a talking machine record from the magazine to the support, and for automatically clamping and transferring a talking machine record from the support to the magazine.

39. In a sound reproducing machine, the combination with a rotatable record support, of a sound reproducer, a magazine, means for automatically transferring a record from the magazine to the support and from the support to the magazine, and means controlled by the reproducer for automatically moving said reproducer out of operative position and simultaneously stopping the record support.

40. In a sound reproducing machine, the combination with a rotatable record support, of a magazine, means for automatically transferring a record from the magazine to the support and from the support to the magazine, and a brake engaging said support and automatically actuated to stop the rotation of said support during the transfer of records.

41. In a sound reproducing machine, the combination with a rotatable record support, of a magazine, and oscillatory means arranged to entirely support and to carry a record between said record support and said magazine.

42. In a sound reproducing machine, the combination with a rotatable record support, of rotating means therefor, a sound box and stylus, a magazine, means for automatically transfering a record from the magazine to the support and from the support to the magazine, and means for moving the stylus into and out of operative position, and means controlled by said sound box for automatically stopping said support substantially simultaneously with the movement of said stylus out of operative position and during the transfer of records.

43. In a talking machine, the combination with a rotatable record support and driving mechanism therefor, of a pivoted record carrier mounted to swing into and out of alinement with said record support and operatively connected to said driving mechanism.

44. In a talking machine, the combination with a substantially flat rotatable record support and driving mechanism therefor, of a record carrier adapted to form the sole support of a record pivoted to swing in a plane parallel to said support and actuated by said driving mechanism.

45. A talking machine comprising a turntable and driving mechanism therefor, a radial arm mounted to swing over said turn-table, a sound box carried by said arm, an auxiliary driving mechanism and means mounted to reciprocate in a vertical line and actuated by said auxiliary driving mechanism for swinging said sound box vertically.

46. In a talking machine, the combination with a turn-table and driving mechanism therefor, of a pivoted record carrier, adapted to form the sole support of an auxiliary driving mechanism, and means actuated by said auxiliary driving mechanism for swinging said carrier.

47. In a talking machine, the combination with a turntable and driving mechanism therefor, of a record carrier pivoted to swing in a plane parallel with said turntable and arranged to form the sole support for a record, and means actuated by said driving mechanism for swinging said carrier.

48. A talking machine comprising a record support, driving mechanism therefor, an arm mounted to swing over said support, a sound box carried by said arm, and means thrown into operation by said driving mechanism for moving said sound box downwardly toward said support, said sound box being continuously under the control of said means while being moved toward said support thereby.

49. In a talking machine, the combination with a support for talking machine records, of a magazine adapted to hold a plurality of disk talking machine records, and means for automatically clamping and moving a disk talking machine record from said magazine to said support.

50. In a talking machine, the combination with a support for talking machine records, of a magazine adapted to hold disk talking machine records, and means for automatically clamping and moving a disk record from said support to said magazine.

51. In a talking machine, the combination with a support for talking machine records, of a magazine for holding disk talking machine records, and means for automatically clamping and moving a disk talking machine record from said magazine to said support and returning the same to said magazine.

52. In a talking machine, the combination with a support for talking machine records, of a magazine for holding disk talking machine records, and means for automatically clamping and moving a disk talking machine record from said magazine to said support and returning the same to its original position in said magazine.

53. In a talking machine, the combination with a rotary support for talking machine records, of actuating means therefor, a magazine for holding a plurality of disk talking machine records, and means automatically actuated by said actuating mechanism for moving a record selectively from said magazine to said support.

54. In a talking machine, the combination with a rotary support for talking machine records, of actuating means therefor, a magazine for holding a plurality of disk talking machine records, and means automatically actuated by said actuating mechanism for moving a talking machine record selectively from said magazine to said support and for returning the same to said magazine.

55. In a talking machine, the combination with a rotary support for talking machine records, of actuating means therefor, a magazine for holding a plurality of disk talking machine records, and means automatically actuated by said actuating mechanism for moving a talking machine record selectively from said magazine to said support and for returning the same directly to its original position in said magazine.

56. In a talking machine, the combination with a support for talking machine records, of a magazine for holding talking machine records, means for transferring records from said magazine to said support, a motor for actuating said support, an auxiliary motor for actuating said record transferring means, and means whereby said first mentioned motor will automatically start said auxiliary motor.

57. In a talking machine, the combination with a support for talking machine records, of a magazine for holding talking machine records, means for transferring records between said magazine and said support, a motor for actuating said support, an auxiliary motor for actuating said record transferring means, and means whereby said first mentioned motor will automatically start said auxiliary motor, and whereby said first mentioned motor will be automatically stopped.

58. In a talking machine, the combination with a support for talking machine records, of a magazine for holding talking machine records, means for transferring records between said magazine and said support, a motor for actuating said support, an auxiliary motor for actuating said record transferring means, means whereby said first mentioned motor will automatically start said auxiliary motor, and whereby said first mentioned motor will be automatically stopped, and means whereby said auxiliary motor will be automatically stopped.

59. In a talking machine, the combination with a support for talking machine records, of a magazine for holding talking machine records, means for transferring records between said magazine and said support, a motor for actuating said support, an auxiliary motor for actuating said record transferring means, means whereby said first mentioned motor will automatically start said auxiliary motor, and whereby said first mentioned motor will be automatically stopped, and means whereby said auxiliary motor will be automatically stopped and said first mentioned motor automatically started.

60. The combination with a talking machine including a record support, a sound box, and means for actuating the talking machine, of means for placing a record on or removing it from said support, a vertically movable supporting rail for the sound box, means for automatically lowering the rail after the record has been placed upon the support, means for raising the rail to lift the sound box from the record after the record has been played to permit the removal of the record from the support, and means controlled by said sound box for automatically stopping the talking machine actuating means upon the raising of the rail.

In testimony whereof, I have hereunto set my hand this 25th day of October, A. D. 1904.

LOUIS P. VALIQUET.

Witnesses:
EDW. W. VAILL, Jr.,
MAX BAYENDORFER.

It is hereby certified that in Letters Patent No. 1,224,979, granted May 8, 1917, upon the application of Louis P. Valiquet, of New York, N. Y., for an improvement in "Automatically-Operated Talking-Machines," errors appear in the printed specification requiring correction as follows: Page 10, claim 38, lines 69–70, 72–73, and 75, for the words "talking machine" read *sound;* same page and claim, line 71, for the word "sounds" read *sound;* page 11, claim 46, line 11, after the word "of" insert the words and comma *a record,;* and that the said Letters Patent should be read with these corrections therein that the same may conform to the record of the case in the Patent Office Signed and sealed this 19th day of June, A. D., 1917.

[SEAL.]
F. W. H. CLAY,
*Acting Commissioner of Patents.*